(12) United States Patent
Mihálik

(10) Patent No.: US 7,402,221 B2
(45) Date of Patent: Jul. 22, 2008

(54) METHOD FOR PRESSURE BONDING OF A BREAKER-TREAD ASSEMBLY WITH A CARCASS ASSEMBLY BY MEANS OF STITCHING IN THE MANUFACTURE OF GREEN TYRES AND DEVICE FOR ACCOMPLISHMENT OF SUCH METHOD

(75) Inventor: Peter Mihálik, Povazská Bystriica (SK)

(73) Assignee: Continenetal Matador Rubber, s.r.o., Puchov (SK)

(*) Notice: Subject to any disclaimer, the term of this patent is extended or adjusted under 35 U.S.C. 154(b) by 278 days.

(21) Appl. No.: 10/514,795

(22) PCT Filed: May 21, 2003

(86) PCT No.: PCT/SK03/00011

§ 371 (c)(1), (2), (4) Date: May 25, 2005

(87) PCT Pub. No.: WO03/097337

PCT Pub. Date: Nov. 27, 2003

(65) Prior Publication Data

US 2006/0037708 A1 Feb. 23, 2006

(30) Foreign Application Priority Data

May 21, 2002 (SK) ................................. 710-2002

(51) Int. Cl.
*B29D 30/28* (2006.01)
(52) U.S. Cl. ..................... 156/130.3; 156/408; 156/410
(58) Field of Classification Search ............. 156/130.3, 156/408–413, 421
See application file for complete search history.

(56) References Cited

U.S. PATENT DOCUMENTS 1,370,100 A 3/1921 Dykes (Continued)

FOREIGN PATENT DOCUMENTS

DE 946185 7/1956

(Continued)

*Primary Examiner*—Geoffrey L Knable
(74) *Attorney, Agent, or Firm*—Ohlandt, Greeley, Ruggiero & Perle, LLP; George W. Rauchfuss, Jr.

(57) ABSTRACT

Described is a method of joining a belt-tread assembly with a carcass assembly by stitching in green tire production such that a pressure is applied in radial inward direction on the rotating outer peripheral surface of a belt-tread assembly (5) partially joined with an inflated carcass assembly (1) of a tire, which is disposed on a tire building drum, the pressure being exerted by inelastic force of at least two stitching rollers (2) which are rotationally and inelastically disposed on a rigid bearing part (3) of the stitching unit. The rigid bearing part (3) is provided with means for mutual symmetrical axial movement in the direction of arrow (6) of the stitching rollers (2) from the central part of the outer peripheral surface of the belt-tread assembly (5) of the tire being produced to its shoulders, with means for moving the rigid bearing part (3) along an axis perpendicular to the rotation axis of the tire being produced, and with means controlling rotational position of the stitching rollers (2) in the direction of arrow (7), the compressive force of the rollers (2) being controlled by the means for moving the rigid bearing part (3) in the direction of an axis perpendicular to the rotation axis of the tire being produced. Also a device for accomplishing the method is described.

4 Claims, 5 Drawing Sheets

U.S. PATENT DOCUMENTS

| | | | |
|---|---|---|---|
| 1,843,850 A | 2/1932 | Thropp et al. | |
| 2,936,023 A * | 5/1960 | Giletta et al. | 156/410 |
| 3,794,542 A * | 2/1974 | Colombani et al. | 156/413 |
| 5,464,489 A | 11/1995 | DeGraaf | 156/126 |
| 5,468,319 A | 11/1995 | Siegenthaler | 156/123 |
| 5,693,176 A | 12/1997 | Tsutsumi | 156/410 |

FOREIGN PATENT DOCUMENTS

| | | |
|---|---|---|
| DE | 2800729 A | 7/1979 |
| WO | WO 01/17758 A1 | 3/2001 |

* cited by examiner

METHOD FOR PRESSURE BONDING OF A BREAKER-TREAD ASSEMBLY WITH A CARCASS ASSEMBLY BY MEANS OF STITCHING IN THE MANUFACTURE OF GREEN TYRES AND DEVICE FOR ACCOMPLISHMENT OF SUCH METHOD

A method for pressure-bonding of a breaker-tread assembly with a carcass assembly by means of stitching in the manufacture of green tyres and device for accomplishment of such method The present invention concerns a method of joining belt-tread assembly with carcass assembly in green tyre production, carried out by pressing a belt-tread assembly radially inwards against the outer peripheral surface of an inflated ring carcass assembly, to achieve mutual joining of the components. The invention concerns also a device for stitching the belt-tread assembly onto the carcass assembly, utilising the method according to the present invention.

BACKGROUND ART

In the process of tyre production a carcass assembly is inflated and shaped on a tyre building drum, so that partial bonding with a belt-tread assembly, prepared in advance, is achieved. Subsequently, the tyre building drum is rotated so that also the belt-tread assembly is rotated together with the inflated carcass.

Final joining of the belt-tread assembly with the inflated carcass assembly is usually performed using compressive force exerted by an elastic cylinder on stitching rollers in radial direction.

Methods of joining a belt-tread assembly with an inflated carcass assembly, known so far, make use of a compressive force exerted in radial direction by an elastic pneumatic cylinder, on which divided stitching rollers are disposed. The divided stitching rollers, differing in diameter, have a profile usually designed so as to press the surface of the tyre tread along its entire length.

A further method of joining a belt-tread with an inflated carcass, makes use of a compressive force exerted in radial direction by an elastic pneumatic cylinder, on which a pair of stitching rollers is located. The pair of stitching rollers gradually symmetrically moves by an axial movement in parallel with the tyre axis from the centre to the belt-tread edges.

There may be various design solutions for the stitching devices. Such devices may be designed, for example, as dynamic that is each of the rollers rotates during stitching around its own axis which is parallel to the rotation axis of the tyre being produced and, simultaneously, the rollers move mutually symmetrically in the direction from the central part of the outer peripheral surface of the tyre being produced to its shoulders, i. e. the stitching rollers are moved in parallel with the rotation axis of the tyre; such design solution can be found, for example, in the patent EP 0 770 475 B1, where a system of two stitching rollers disposed on pneumatic cylinders attached to a fixed support is used, wherein the movement of the support in radial direction and the movement of stitching rollers disposed on pneumatic cylinders in axial direction is ensured by means of threaded rods connected with electric motors. A device according to the above patent comprises also means for deflecting the rotation axis of the stitching rollers from a position parallel to the rotation axis of the tyre building drum.

A further type of stitching devices is constituted by static stitching devices in which, when used, rollers are moved only around their own axes without relative movement of the rollers used. A combination of static and dynamic rollers is possible as well. It is described e.g. in the patent EP 0 627 302 B1, where the subject-matter of the invention is a device for radial tyre production, a part of the device consisting of a pressure unit provided with at least one roller. Specifically, there are three rollers, wherein one of them being static presses down the central part of the outer peripheral surface of the tyre and two dynamic rollers are disposed so as to press down the belt-tread edges. These rollers are moved by the action of a pneumatic cylinder into openings of a transfer unit, which is adapted specifically for this purpose and transfers the belt and tread from a winding drum to the tyre building drum.

Static stitching rollers may be designed also as divided, having different diameters, and their profile allows to press down the tyre tread surface along its entire width. However, also when using divided stitching rollers, it is possible to make use also of the movement of the stitching unit with rollers in a direction parallel to the building drum axis, as described, for example, in the patent SU 1305056 A1, where each single part of the divided stitching roller comprises a spring, so that its position is not fixed, but can vary depending on the varying surface during axial movement of the divided roller relative to the building drum axis.

By using the above devices it is possible to accomplish a method of pressing down—stitching a belt-tread assembly to a carcass assembly, wherein in this case elastic elements acting in opposite directions come into contact, namely the inflated belt-tread assembly and the pneumatic cylinder with stitching rollers. If common surface non-uniformities of the rotating belt-tread occur, mutual interaction of stitching rollers and belt-tread arises. This interaction has an adverse effect on the uniformity of the produced tyres.

Disadvantages of the above methods consist in lower uniformity of the produced tyres, deformation of carcass fibres, possibility of presence of air pockets in the tyre shoulders and complicated adjusting of the stitching roller profile during dimension change of the produced tyres.

Now it has been surprisingly found that the above interaction between two elastic elements, which consist of a pneumatic cylinder constituting a part of the stitching unit containing at least one stitching roller and of an inflated carcass assembly, can be reduced in such a way that no elastic element, but instead a rigid inelastic element is used in the design of the stitching unit. Utilising the method and device according to the present invention higher uniformity of the produced tyres is achieved.

A method of green tyre production usually includes the following operations:

- production of an integrated carcass assembly in the form of a cylinder jacket, consisting usually of inner rubber, sidewalls and carcass plies, and subsequent mounting of bead wires,
- production of the belt-tread assembly in the form of a cylinder jacket, usually consisting of several belt plies and a tread,
- transferring the belt-tread assembly to a given position over the carcass assembly,
- shaping the carcass assembly into a toroidal shape by inflating the assembly with simultaneous approaching the bead wires, turn-up the carcass plies and sidewalls around the bead wires, pressing the sidewalls of the tyre being produced against the carcass assembly, wherein during the drum rotation the inflated carcass assembly is partially joined with the belt-tread assembly which rotates on the building drum together with the inflated carcass assembly in the form of a toroid, complete joining the belt-tread assembly with the carcass assembly in the form of a toroid by stitching during rotation of the building drum.

DISCLOSURE OF INVENTION

The above disadvantages are substantially eliminated by a method of joining a belt-tread assembly with a carcass assembly by stitching on a tyre building drum in tyre production according to the present invention, the subject-matter of which consists in that a pressure is applied in radial inward direction on the outer peripheral surface of the rotating belt-tread assembly connected with the carcass assembly in the form of a toroid located on the building drum, the pressure being exerted by at least two rollers, which are rotationally and inelastically disposed on a rigid bearing part of the stitching unit, which is provided with means for mutual symmetrical axial movement of the stitching rollers from the central part of the rotating outer peripheral surface of the belt-tread assembly of the tyre being produced to its shoulders, and possibly also with means for deflecting the rotation axis of the stitching rollers from the position parallel to the rotation axis of the tyre being produced, thus the rotation axis of the building drum. The compressive force of the rollers is regulated (controlled) by means for moving the rigid bearing part in the direction of an axis perpendicular to the rotation axis of the tyre being produced. The means for moving the rigid bearing part in the direction of an axis perpendicular to the rotation axis of the tyre being produced serve also for bringing the rigid bearing part to a predetermined position at stitching, as well as for moving the rigid bearing part in the course of the stitching process depending on the position of the stitching rollers on the rotational surface of the tyre being produced.

Radial movement of the stitching unit represents movement of the rigid bearing part in a direction perpendicular to the rotation axis of the tyre being produced. Radial movement of the stitching unit, provided in the form of a rigid bearing part with at least two inelastically arranged stitching rollers, to a defined position, i. e. to a defined radial distance of the axis of the stitching rollers from the building drum axis, is controlled automatically.

Likewise, the symmetrical movement of the stitching rollers in the direction from the central part of the outer peripheral surface of the tyre being produced to its shoulders, i. e. in parallel to the axis of the rotating building drum, is controlled automatically, wherein simultaneously also the rotation axis of the stitching rollers is deflected from a position parallel to the rotation axis of the tyre being produced, so that the radial force, exerted in this way on the outer peripheral surface, can be utilized in a most effective way, and also radial movement of the rigid bearing part is performed, so that the magnitude of the compressive force, exerted by the stitching rollers, is maintained during the movement of the stitching rollers along the curved outer peripheral surface of the tyre being produced.

The subject-matter of the present invention is also a device for stitching the belt-tread assembly onto the carcass assembly located on the building drum containing driving means for rotating the building drum, wherein the stitching unit comprises at least two stitching rollers inelastically attached to the bearing part, the rollers rotate around an axis which is parallel to the building drum axis, means for bringing the rigid bearing part to a predetermined position near the rotating carcass assembly which is partially joined with the belt-tread assembly. These means serves also for moving the rigid bearing part with stitching rollers in the course of the stitching process depending on the mutual position of the stitching rollers. The stitching device further includes means for mutual symmetrical movement of the stitching rollers from the central part of the outer peripheral surface of the rotating tyre being produced to its shoulders after the stitching rollers have contacted the above surface, and means for controlling the deflection of the rotation axis of the stitching rollers from the position parallel to the rotation axis of the tyre being produced, wherein the stitching rollers are constructed as inelastic.

Any known structural solution for the means for deflecting the rotation axis of the stitching rollers from the position parallel to the rotation axis of the tyre being produced can be used, provided that the stitching rollers are attached in an inelastic way, that means they must not be disposed, for example, on pneumatic cylinders.

The method of stitching the belt-tread assembly onto the carcass assembly in tyre production and a device, utilizing this method, will be explained in more detail by means of attached drawings and examples of embodiments.

EXAMPLES

Figure 1:
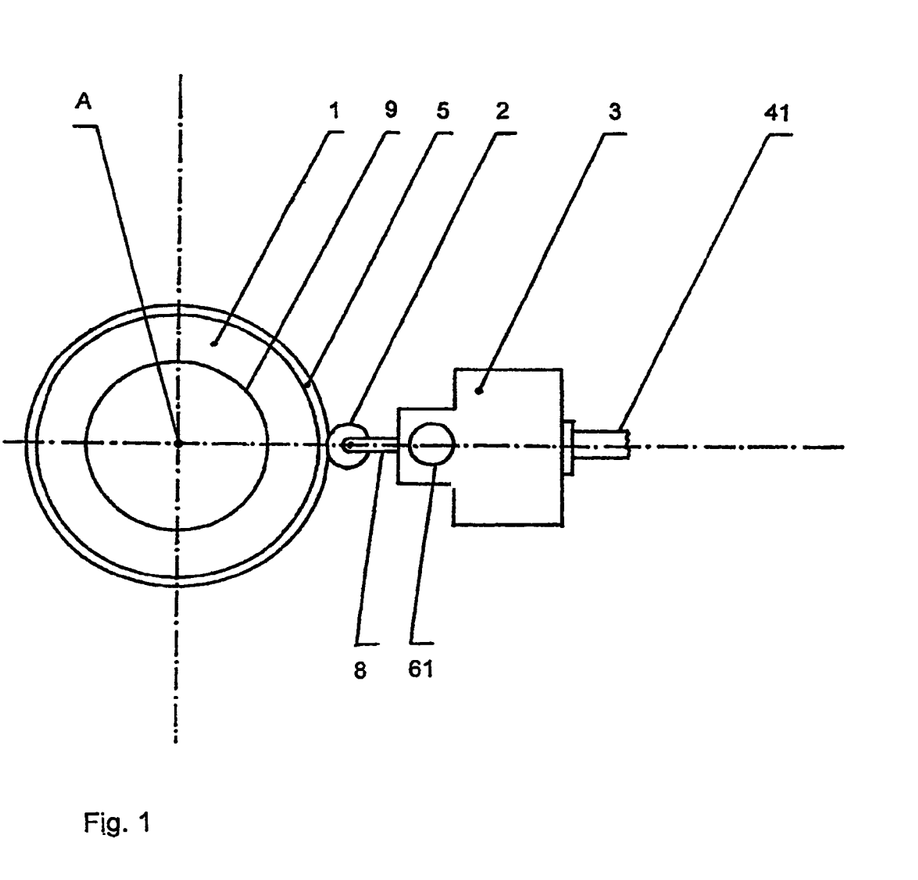
FIG. 1 shows schematically a side view of an arrangement of a device according to the present invention relative to the building drum.

The device, schematically shown in FIG. 1, consists of a building drum 9 with lever arms, wherein the drum is provided with driving means, ensuring its rotation in a given direction and at a given speed. Around the outer periphery of the building drum, there is wrapped a carcass assembly 1 over which a belt-tread assembly 5, prepared in advance, is brought to a predetermined space. The building drum 9 is designed so as to be able to inflate the carcass assembly wrapped around it by compressed air, wherein a certain pressure value is achieved. Through inflating the carcass assembly 1 partial joining of the carcass assembly 1 with the belt-tread assembly 5 is obtained and subsequent rotation of the building drum causes rotation of the carcass assembly 1 with partially joined belt-tread assembly 5.

Near the building drum 9 a stitching unit according to the present invention is located, the unit consisting of a rigid bearing part 3, on which at least two stitching rollers 2 are disposed on supports 8, each of the rollers being rotatable around its own axis which is parallel to the rotation axis A of the tyre being produced on the drum.

Figure 2:
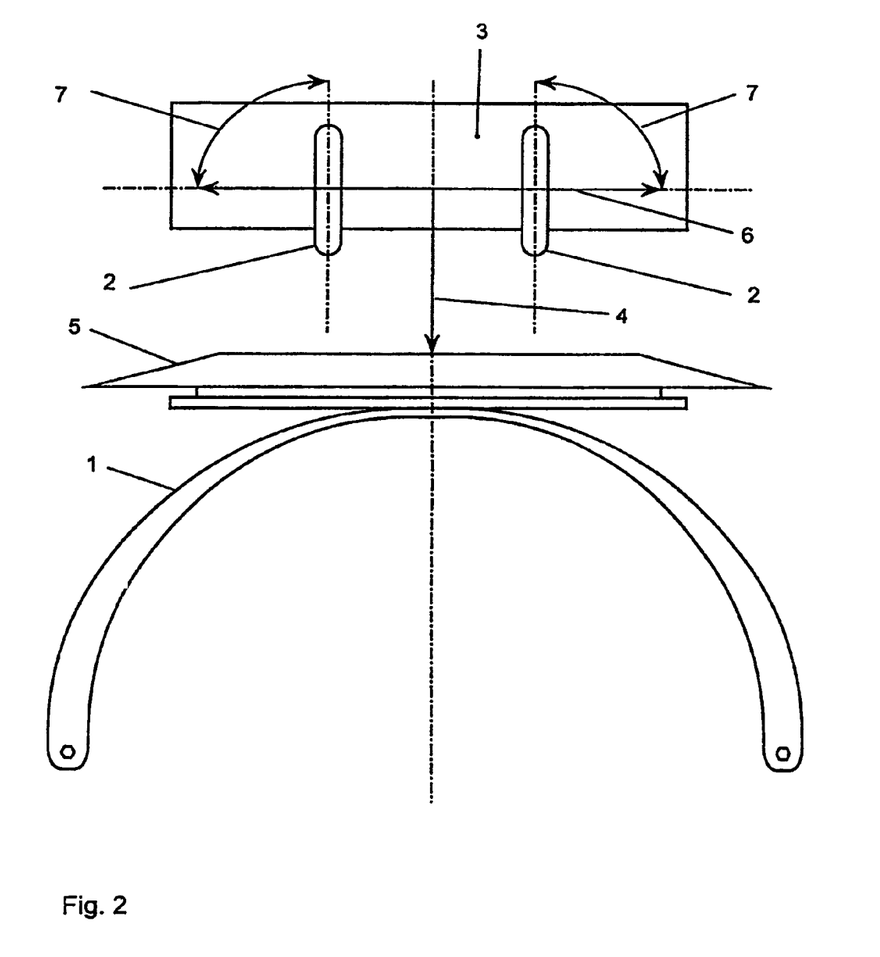
FIG. 2 shows schematically possibilities of movement of separate parts of the stitching unit in the course of the process of stitching the belt-tread assembly onto the carcass assembly according to the present invention.

As can be seen in FIG. 2, the rigid bearing part 3 of the stitching unit, and thus also the stitching rollers 2 may be radially moved during the stitching process in the direction of arrow 4. Besides the movement in the direction of arrow 4 the stitching rollers 2 can be axially moved in the direction of arrow 6, as well as their rotation axes can be deflected in the direction of arrow 7 from a position parallel to the rotation axis A of the green tyre being produced.

Figure 3:
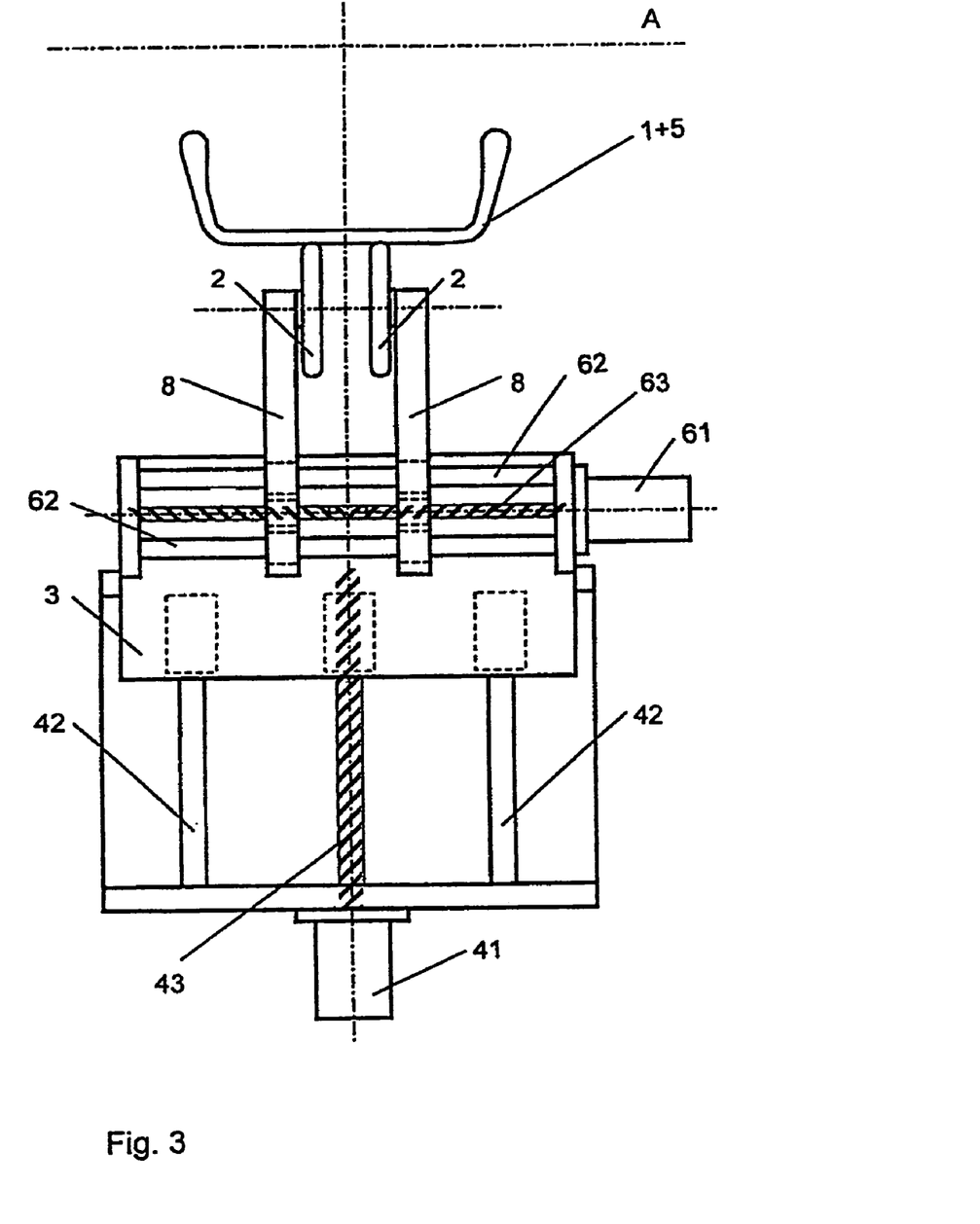
FIG. 3 shows schematically a device for stitching the belt-tread assembly onto the carcass assembly according to the present invention.

Referring to FIG. 3, the mechanisms of radial movement in the direction of arrow 4 of the rigid bearing part 3 of the stitching unit and of axial movement in the direction of arrow 6 of the stitching rollers 2 will be described. The radial movement of the rigid bearing part 3 of a device utilizing the method according to the present invention is ensured by means of a servomotor 41, a threaded rod 43 connected with the motor, and slides 42, wherein all these parts are arranged in radial direction relative to the axis A of the building drum. Servomotor 41 causes the threaded rod 43 provided with threading to rotate, causing the bearing part 3 to move along the slide 42 radially towards the outer peripheral surface of the green tyre being produced. After completing the stitching operation reverse motion of the servomotor 43 and thus rotational movement of the threaded rod 43 in the opposite direction moves the stitching unit away from the green tyre produced. The same principle has been used also for the axial movement of the stitching rollers, wherein the arrangement of all parts, that is of the servomotor 61, of the rod 63 joined with it and provided with right-handed threading over one half of its length and with left-handed threading over the other half of its length, and of slides 62, is parallel to the axis A of the building drum. To ensure rotational movement of the stitching rollers 2 around their axis parallel to the axis A of the building drum 9 it is preferred to locate the rollers on supports 8. In this way, the supports 8 have at their ends facing the building drum stitching rollers 2, which rotate around their axes when contacting the rotating tyre being produced, and they are joined by their other ends with the rod 63 provided with right-handed threading over one half of its length and with left-handed threading over the other half of its length. In this case the action of servomotor 61 causes rotation of the rod 63 provided with right-handed and left-handed threading, the consequence of which is symmetrical movement of the supports 8 from the central part of the outer peripheral surface of the tyre being produced to its shoulders. Backward movement of the stitching rollers 2 is accomplished by reverse motion of servomotor 61.

Figure 4:
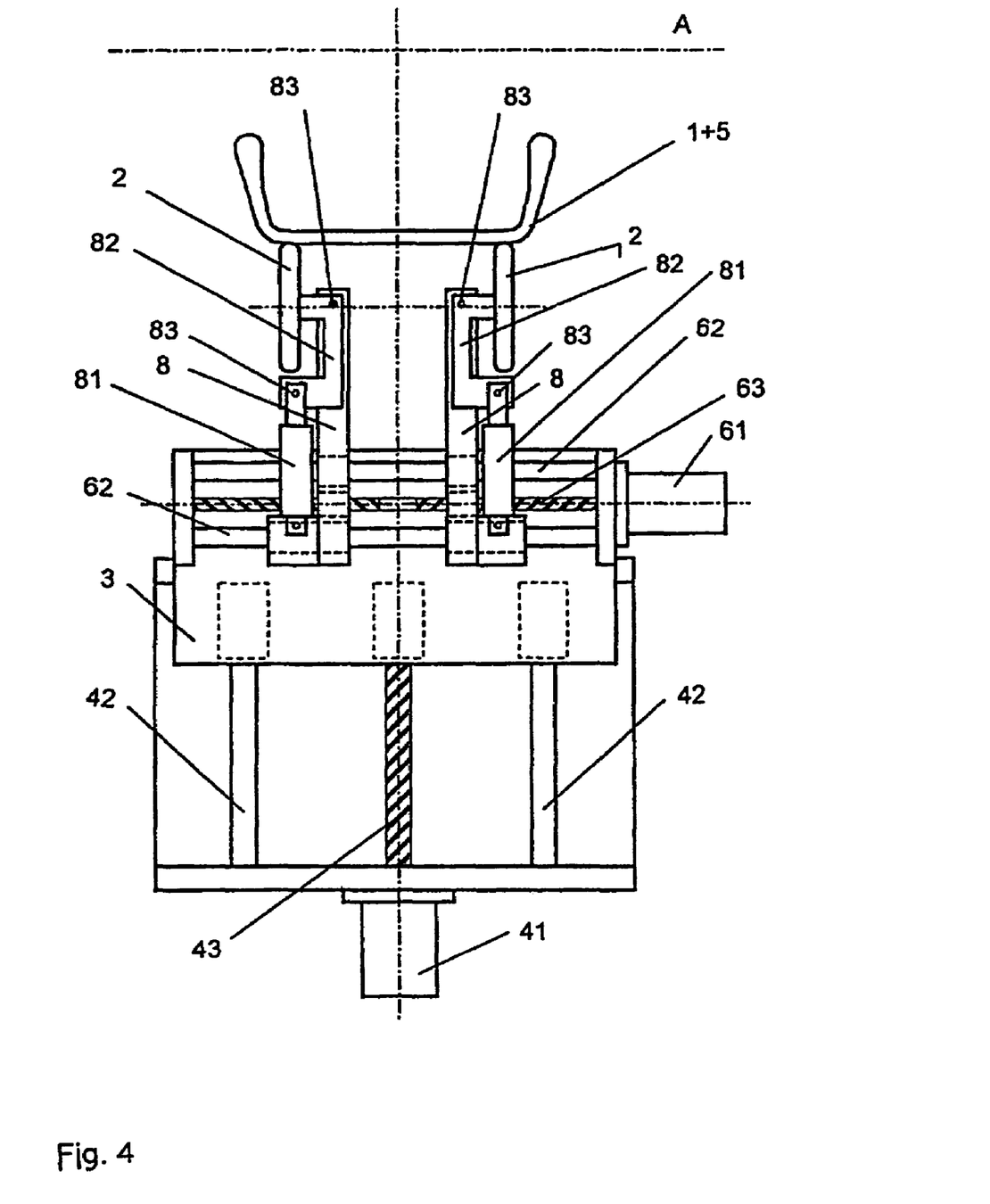
FIG. 4 shows a stitching device according to the present invention having a possibility to deflect the rotation axis of the stitching rollers from a position parallel to the rotation axis of the tyre being produced.

Deflecting the axes of stitching rollers from an axis parallel to the rotation axis of the tyre being produced can be accomplished, for example, in the way according to FIG. 4. On each of the supports 8, there is located an auxiliary support 82 which is joined with the support 8 through a pivoted joint 83. The end of the auxiliary support 82 closer to the building drum 9 is provided with a pivotally attached stitching roller 2. Linear servomotors 81 are joined with the supports 8 and auxiliary supports 82 through pivoted joints. Throwing out pistons of the linear servomotors 81 causes deflection of the stitching rollers 2.

Exact positioning of the stitching rollers 2 by means of supports 8 driven by the servomotor 61, of the bearing part 3 driven by the servomotor 41, pressure in the inflated tyre being produced, as well as the speed of rotation of the building drum 9 are controlled by a control system in such a way that perfect splicing between the belt-tread assembly 5 and the carcass assembly 1 is achieved in reasonable time.

Figure 5:
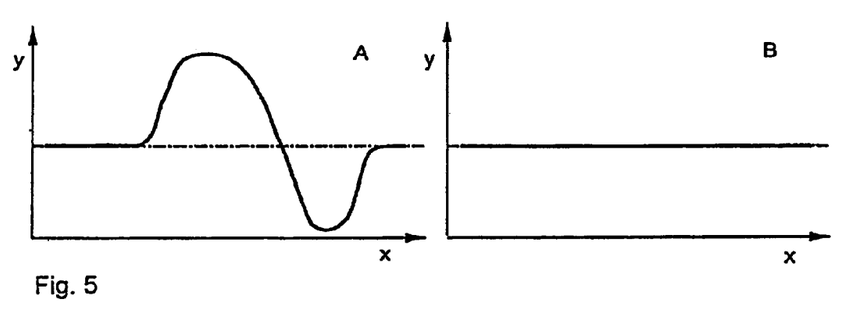
FIG. 5 shows schematically deflection of a roller in radial direction when axially moving relative to the building drum axis in the case that the roller comes across a surface roughness A in the traditional stitching method
B in the stitching method according to the present invention.
Figure 6:
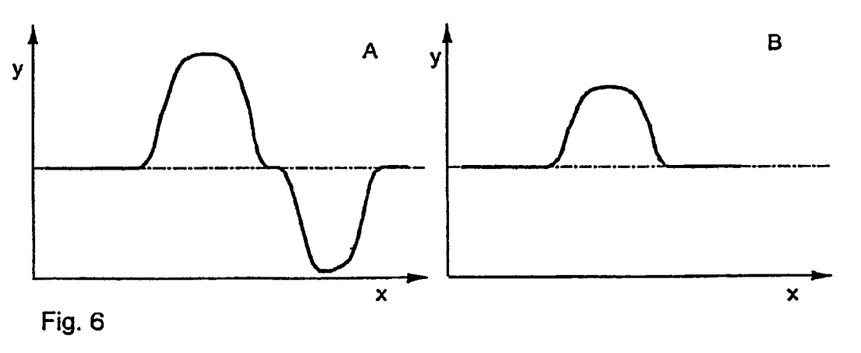
FIG. 6 shows graphical representation of radial strength of a tyre, referred to as the so called "peak to peak" value
A in the traditional stitching method
B in the stitching method according to the present invention.

Uniformity of tyres being produced is a quantity which can be assessed using the value of radial force of the tyre as the so called "peak to peak" value. Therefore, the description includes also FIG. 5, which shows schematically deflection of a roller in radial direction when moving axially relative to the building drum axis in the case, where this roller comes across a surface roughness in the traditional stitching method and in the stitching method according to the present invention, and FIG. 6 which shows graphical representation of the above radial force of the tyre, indicated as the so called "peak to peak" value in the traditional stitching method and in the stitching method according to the present invention. FIGS. 5 and 6 clearly show the advantages of this invention in comparison with the background art.

The invention claimed is:

1. A device for joining a belt-tread assembly with a carcass assembly by stitching in tyre production, characterized in that it comprises:
    a rigid bearing part (3)
    at least two rotationally attached stitching rollers (2), each of them being independently, inelastically and axially movably attached to the rigid bearing part (3), which is provided with
    means for axial mutually symmetrical movement of the stitching rollers (2), wherein the means are formed by at least one slide (62), arranged in parallel with a rod (63), which is provided symmetrically from its centre with threadings of opposite pitch sense and is joined with one end of supports (8), which is adapted for symmetrical movement of supports (8) along the rod (63), controlled by a servomotor (61) for axial mutually symmetrical movement of the stitching rollers (2), which are rotationally attached at other ends of supports (8), wherein the stitching rollers (2) have an axis parallel to a rotation axis A of the tyre being produced, and
    inelastic means for moving the rigid bearing part (3) in a direction perpendicular to the rotation axis A of a tyre being produced for bringing the rigid bearing part (3) to a predetermined position and to control compressive force of the rollers on the green tyre being produced, the means being formed by at least one slide (42) parallel to a threaded rod (43), which is connected with a servomotor (41), wherein the threaded rod (43) together with the at least one slide (42) is arranged perpendicularly to the rod (63) provided symmetrically from its centre by threadings of opposing pitch with the proviso that the compressive force of the rollers is not induced by pneumatic cylinders.

2. A device for joining a belt-tread assembly with a carcass assembly by stitching in tyre production according to claim 1, additionally comprising
    means for controlling deflection of a rotation axis of the stitching rollers (2) from a position parallel to the rotation axis A of the tyre being produced, which are connected with the respective supports (8), wherein each of the supports (8) is provided with an auxiliary support (82), provided at one of its ends with a one of said rotationally disposed stitching rollers (2) and joined by the other end through a pivoted joint (83) with a linear servomotor (81), which is joined with the support (8) through said pivoted joint (83).

3. A method of joining a belt-tread assembly with a carcass assembly by stitching in tyre production using the device according to 1, in which pressure is applied in radial inward direction on an outer peripheral surface of a rotating belt-tread assembly connected with an inflated carcass assembly of a tyre, which is disposed on a tyre building drum, the pressure being exerted by said at least two stitching rollers which are rotationally and disposed on said device, wherein said device is provided with means for mutual symmetrical inelastic and axial movement of the stitching rollers from a central part of the outer peripheral surface of the belt-tread assembly of the tyre being produced to edges of the belt-tread assembly, and with said means for moving the stitching rollers along an axis perpendicular to the rotation axis A of the tyre being produced, characterised in that compressive force of the rollers being controlled by inelastic means for moving the said rigid bearing part in the direction of an axis perpendicular to the rotation axis of the tyre being produced with the proviso that the compressive force of the rollers is not induced by pneumatic cylinders.

4. A method of joining a belt-tread assembly with a carcass assembly by stitching in tyre production using the device according to claim 2, in which pressure is applied in radial inward direction on an outer peripheral surface of a rotating belt-tread assembly connected with an inflated carcass assembly of a tyre, which is disposed on a tyre building drum, the pressure being exerted by said at least two stitching rollers which are rotationally and disposed on said device, wherein said device is provided with means for mutual symmetrical inelastic and axial movement of the stitching rollers from a central part of the outer peripheral surface of the belt-tread assembly of the tyre being produced to edges of the belt-tread assembly, with said means for moving the stitching rollers along an axis perpendicular to the rotation axis A of the tyre being produced, and with said means controlling the rotational position of the stitching rollers, characterised in that compressive force of the rollers being controlled by inelastic means for moving the said rigid bearing part in the direction of an axis perpendicular to the rotation axis of the tyre being produced with the proviso that the compressive force of the rollers is not induced by pneumatic cylinders.

* * * * *